US008775973B2

(12) United States Patent
Cabrera-Cordon et al.

(10) Patent No.: US 8,775,973 B2
(45) Date of Patent: Jul. 8, 2014

(54) PRESENTATION OF SEARCH RESULTS

(75) Inventors: Luis Eduardo Cabrera-Cordon, Bothell, WA (US); John E. Inman, Duvall, WA (US); Darren David, San Francisco, CA (US); Joshua Santangelo, Seattle, WA (US); Lon Charles Lundgren, Jr., Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 13/083,248

(22) Filed: Apr. 8, 2011

(65) Prior Publication Data

US 2012/0174011 A1 Jul. 5, 2012

Related U.S. Application Data

(60) Provisional application No. 61/429,701, filed on Jan. 4, 2011.

(51) Int. Cl.
*G06F 3/00* (2006.01)
(52) U.S. Cl.
USPC ............................................ 715/853
(58) Field of Classification Search
USPC ................. 715/764, 767, 834, 837, 838, 853
See application file for complete search history.

(56) References Cited

U.S. PATENT DOCUMENTS 5,982,369 A * 11/1999 Sciammarella et al. ...... 715/835
6,968,511 B1 * 11/2005 Robertson et al. ............ 715/835

2004/0230599 A1 * 11/2004 Moore et al. .................. 707/102
2010/0131499 A1 5/2010 Van Leuken et al.
2011/0252016 A1 * 10/2011 Shacham et al. ............. 707/706

OTHER PUBLICATIONS

Ali, Kawsar, "10 Awesome Techniques and Examples of Animation with jQuery", Retrieved at <<http://sixrevisions.com/javascript/10-awesome-techniques-and-examples-of-animation-with-jquery/>>, Nov. 1, 2009, pp. 20.
Bonnel, et al., "Effective Organization and Visualization of Web Search Results", Retrieved at <<http://hal.inria.fr/docs/00/06/31/99/PDF/Bonnel_EuroIMSA06_web.pdf>>, Proceedings of the 24th IASTED International Multi-Conference Internet nd Multimedia Systems and Applications, Feb. 13-15, 2006, pp. 8.
Jing, et al., "IGroup: Web Image Search Results Clustering" Retrieved at <<http://research.microsoft.com/en-us/um/people/leizhang/Paper/ACMMM06_13 IGroup.pdf>>, Proceedings of the 14th annual ACM international conference on Multimedia, Oct. 23-27, 2006, pp. 8.
"LinearLayout", Retrieved at <<http://developer.android.com/reference/android/widget/LinearLayout.html>>, Jan. 5, 2010, pp. 8.
Schellemberg, Arya, "Share Your Search Results using Sortfix", Retrieved at <<http://www.sortfix.com/blog/gui-and-design/share-your-search-results-using-sortfix/>>, May 10, 2010, pp. 3.

* cited by examiner

*Primary Examiner* — Thanh Vu
(74) *Attorney, Agent, or Firm* — Jeremy Snodgrass; Glen Johnson; Micky Minhas (57) ABSTRACT

Various embodiments are described that are related to displaying search requests on an interactive display device. For example, one disclosed embodiment provides a method including receiving a search request input via a search request control displayed on the interactive display device, spawning a search result label spaced from the search request control, the search result label being a moveable element, and displaying the search result, the search result being spatially tethered to the search result label so that the search result moves to follow a movement of the search result label.

20 Claims, 10 Drawing Sheets

PRESENTATION OF SEARCH RESULTS

CROSS REFERENCE TO RELATED APPLICATIONS

This application claims priority to U.S. Provisional Patent Application Ser. No. 61/429,701, titled "Presentation of Search Results," and filed on Jan. 4, 2011, the entirety of which is hereby incorporated herein by reference for all purposes.

BACKGROUND

Interactive display systems, such as surface computing devices, include a display screen and a touch sensing mechanism configured to detect inputs made via the display screen. Various types of touch sensing mechanisms may be used, including but not limited to optical, capacitive, and resistive mechanisms. An interactive display system may utilize a touch sensing mechanism as a primary user input device, thereby allowing the user to interact with the device without keyboards, mice, or other such traditional input devices.

SUMMARY

Various embodiments are described herein that are related to displaying search requests on an interactive display device to users. For example, one disclosed embodiment provides a method comprising receiving a search request input via a search request control displayed on the interactive display device, spawning a search result label spaced from the search request control, the search result label being a moveable element, and displaying the search result, the search result being spatially tethered to the search result label so that the search result moves to follow a movement of the search result label.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, an interactive display device may utilize a touch-sensitive display as a primary input device. Thus, touch inputs, including gesture inputs and hover inputs (i.e. gestures performed over the surface of the display), may be used to interact with all aspects of the device, including applications and the operating system. For example, in some environments an interactive display device may have a table-like configuration with a horizontal display. Such configurations may facilitate multi-touch interaction with the device by groups of users, who may interact with the display surface, for example, to collaborate on a shared activity or to enjoy an entertainment experience, among other potential uses. Further, these interactive display devices may display more than one application concurrently, allowing users to make visual and logical connections between applications via touch inputs. By enabling such connections to be formed (and broken) in a casual, collaborative, and dynamic way, users may be comparatively more engaged in the collaborative effort relative to scenarios where individual users interact via individual work stations.

However, conventional search technology is often geared toward individual work stations, presenting search results in hierarchical lists or tile grids via a search portal. A user wishing to maintain more than one list of search results at a time may need to open a plurality of browsers or browser tabs, creating a cluttered display and consuming computing resources that degrade the user experience.

Accordingly, various embodiments are disclosed herein that relate to spawning and arranging search results on a display to help make touch and gesture-based manipulation of the results on interactive display devices more amenable to collaboration. Further, users may manipulate search results from more than one search request individually or collectively without instantiating more than one application instance. At bottom, users may spawn, manipulate, modify, and retire search results using touch inputs to a visually-engaging display environment. While discussed in the context of touch input (including the gesture and hover inputs described above), the embodiments described herein may be used with input received from other suitable user input devices, such as 3-D cameras, cursor control devices such as trackballs, pointing sticks, styluses, mice, etc.

Prior to discussing these embodiments, an example interactive display device 100 is described with reference to FIG. 1. Interactive display device 100 includes a display 102 configured to display images and to receive touch inputs. Non-limiting examples of display 102 include emissive display panels such as plasma displays and OLED (organic light emitting device) displays, modulating display panels such as liquid crystal displays (LCD), projection microdisplays such as digital micromirror devices (DMDs) or LCD microdisplays, and cathode ray tube (CRT) displays. It will be understood that various other hardware elements not depicted in FIG. 1, such as projectors, lenses, light guides, etc., may be used to produce an image for display on display 102. It further will be understood that interactive display device 100 may be any suitable type of device, including but not limited to a mobile device such as smart phone or portable media player, slate computer, tablet computer, personal computer, laptop computer, surface computer, television system, etc.

Interactive display device 100 further includes a touch and/or hover detection system 104 configured to detect touch inputs and/or hover inputs on or near display 102. As mentioned above, the touch and/or hover detection system 104 may utilize any suitable mechanism to detect touch and/or hover inputs. For example, an optical touch detection system may utilize one or more cameras to detect touch inputs, e.g., via infrared light projected onto the display screen and/or via a frustrated total internal reflection (FTIR) mechanism. Likewise, an optical touch and/or hover detection system 104 may utilize a sensor-in-pixel display panel in which image sensor pixels are interlaced with image display pixels. Other non-limiting examples of touch and/or hover detection system 104 include capacitive and resistive touch detection systems.

Interactive display device 100 also includes a logic subsystem 106 and a data-holding subsystem 108. Logic subsystem 106 is configured to execute instructions stored in data-holding subsystem 108 to implement the various embodiments described herein.

Logic subsystem 106 may include one or more physical devices configured to execute one or more instructions. For example, logic subsystem 106 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 106 may include one or more processors that are configured to execute software instructions. Additionally or alternatively, logic subsystem 106 may include one or more hardware or firmware logic machines configured to execute hardware or firmware instructions. Processors of logic subsystem 106 may be single core or multicore, and the programs executed thereon may be configured for parallel, distributed, or other suitable processing. Logic subsystem 106 may optionally include individual components that are distributed throughout two or more devices, which may be remotely located and/or configured for coordinated processing. One or more aspects of logic subsystem 106 may be virtualized and executed by remotely accessible networked computing devices configured in a cloud computing configuration.

Data-holding subsystem 108 may include one or more physical, non-transitory, devices configured to hold data and/or instructions executable by logic subsystem 106 to implement the herein described methods and processes. When such methods and processes are implemented, the state of data-holding subsystem 108 may be transformed (e.g., to hold different data).

Data-holding subsystem 108 may include removable computer media and/or built-in computer-readable storage media and/or other devices. Data-holding subsystem 108 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 108 may include devices with one or more of the following characteristics: volatile, nonvolatile, dynamic, static, read/write, read-only, random access, sequential access, location addressable, file addressable, and content addressable. In some embodiments, logic subsystem 106 and data-holding subsystem 108 may be integrated into one or more common devices, such as an application specific integrated circuit or a system on a chip.

Figure 1:
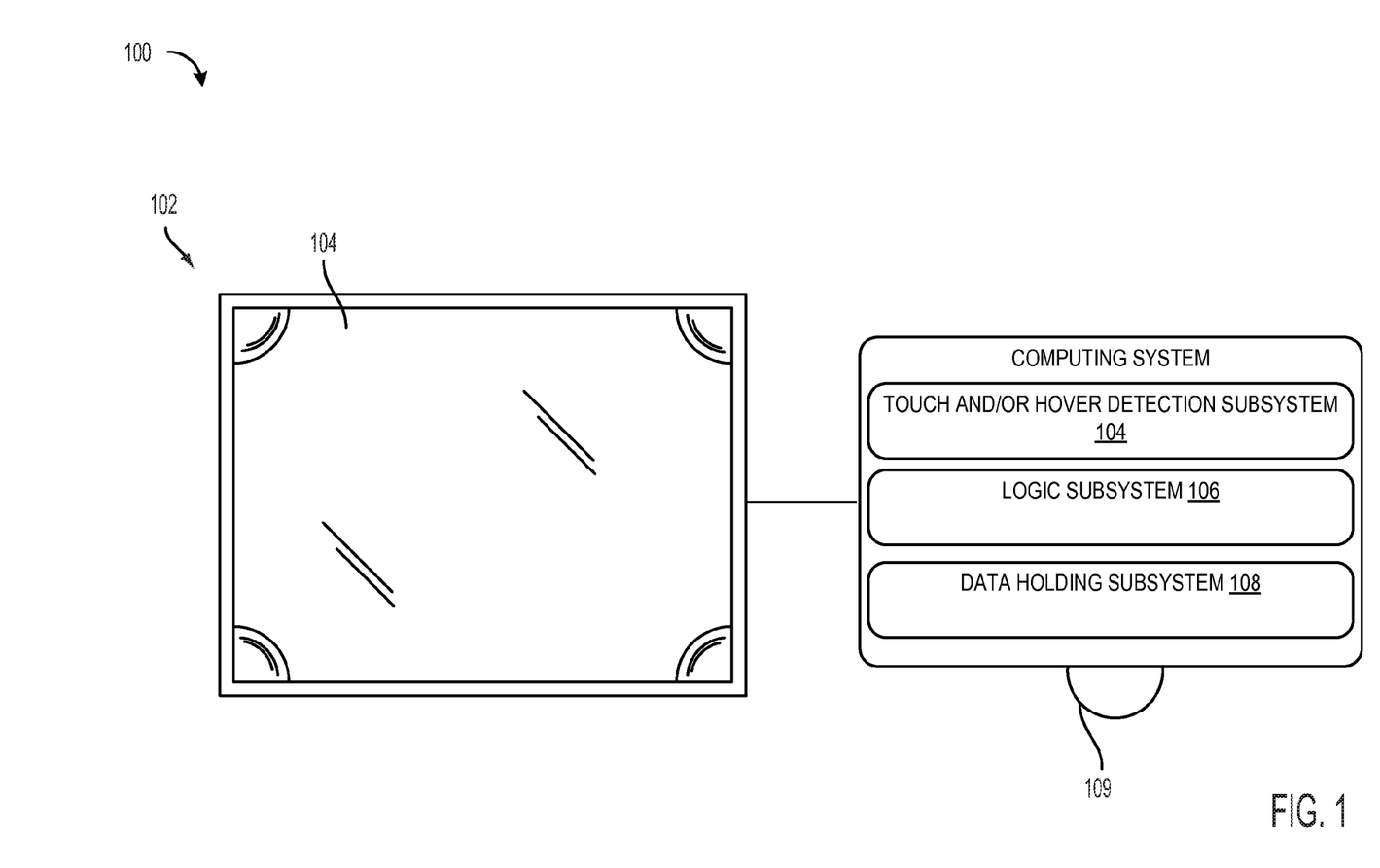
FIG. 1 schematically shows an embodiment of an interactive display device.

FIG. 1 also shows an aspect of data-holding subsystem 108 in the form of removable computer-readable storage media 109, which may be used to store and/or transfer data and/or instructions executable to implement the herein described methods and processes. Removable computer-readable storage media 109 may take the form of CDs, DVDs, HD-DVDs, Blu-Ray Discs, EEPROMs, and/or floppy disks and/or other suitable magnetic media, among others.

Figure 2A:
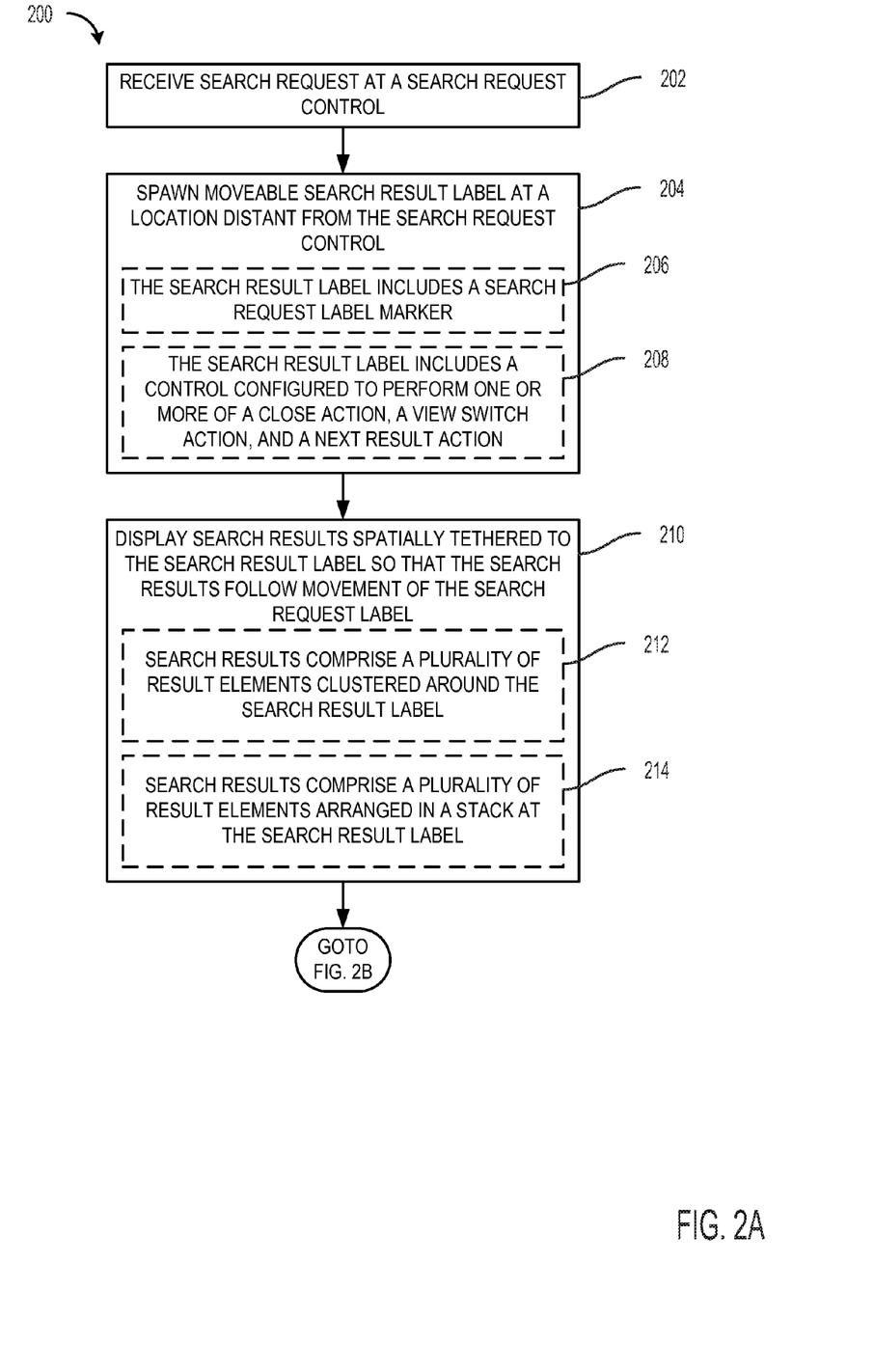
FIGS. 2A and 2B show a flowchart illustrating an embodiment of a method of displaying search results on an interactive display device.
Figure 2B:
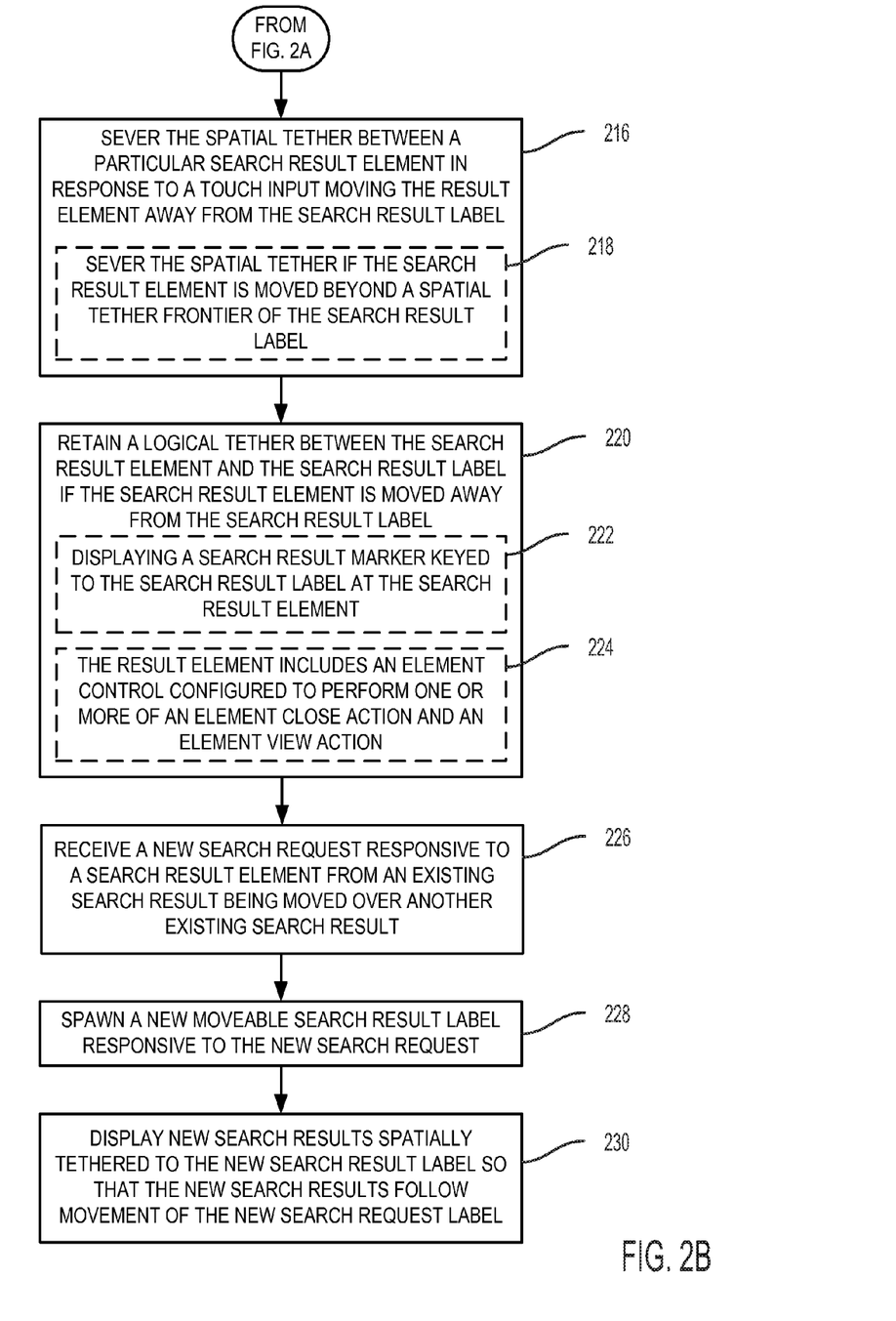

As described above, the embodiments described herein relate to spawning and arranging search results on a display which may help make touch and gesture-based manipulation of the results on interactive display devices more amenable to collaboration. FIGS. 2A and 2B show a flow chart illustrating a method 200 of displaying search results responsive to search requests received from a user. By way of explanation of method 200, FIGS. 3-15, discussed in more detail below, schematically depict example displays showing various aspects of method 200. However, neither the displays shown in FIGS. 3-15 nor the flow chart shown in FIGS. 2A and 2B are limiting, as method 200 may be ordered in any suitable way. Some embodiments may omit portions shown in FIGS. 2A and 2B, and/or may include aspects not depicted in FIGS. 2A and 2B.

As shown in FIG. 2A, method 200 includes, at 202, receiving a search request. The search request may be input by a user in any suitable way. In one example, the search request may be received via a user input at a search request control (such as a search bar in operative communication with a search engine) displayed on the interactive display device, while in another example the search request may be received via user input to a wireless computing device networked with the interactive display device.

At 204, method 200 comprises spawning a search result label at a location spaced from the search request control. The search result label is a moveable display element that may be repositioned on the display in response to touch input. Further, the search result label tags the search results so that the user may identify search results presented on the display as being generated in response to a particular search request. Thus, the search result label may assist the user by distinguishing search results spawned from a plurality of search requests displayed concurrently.

In some embodiments, spawning a search result label 204 further comprises, at 206, including a search result marker on the search result label. The search result marker may provide an additional visual cue that search result elements are to be associated with a particular search request.

Additionally or alternatively, in some embodiments, control elements may be provided to assist user interaction with the search results. Thus, in the embodiment of method 200 shown in FIG. 2A, spawning the search result label at 204 may further comprise, at 208, including a label control on the search result label configured to perform one or more of a view switch action, a next result action, and a label close action. Thus, a touch input may be used to swap view arrangements for the search results, toggle through additional search result elements, and close a search result if the user is finished interacting with that particular search result. While the control elements described herein relate graphical elements configured to receive touch input, it will be appreciated that any suitable control may be provided without departing from the scope of the present disclosure. For example, gesture-based touch input to a search result label and/or a search result element may result in the performance of a complementary action, such as swapping view arrangements, toggling through additional search result elements, toggling through assorted views for one or more search results elements, closing a particular search result element and/or a set of search results, etc.

At 210, method 200 comprises displaying the search results so that they are spatially tethered to the search result label. Put another way, the search results are configured to follow movement of the corresponding search result label as the search result label is moved on the display. Thus, the spatial tether shepherds individual search result elements as the user moves the search result label on the display. For example, a user may move the search results to a different location on the display by performing a drag gesture initiated on the search result label, so that the user may arrange and rearrange the results of one or more search requests on the display without needing to drag individual search result elements to the new location.

In some embodiments, displaying the search results 210 may comprise, at 212, displaying the search results (or a select number of search result elements) in a cluster around the search result label. This may provide a convenient way to casually view a select number of search result elements at concurrently. In one non-limiting example, clusters of ten (or other number of) search result elements may be displayed surrounding the search result label. Further, in some embodiments, a next result control may be included in the search result label, such that a user touch to the next result control may cause the next ten (or other number of) search result elements to be displayed in a cluster surrounding the search result label replacing or supplementing the other search results, and so on.

Additionally or alternatively, in some embodiments, displaying the search results 210 may comprise, at 214, displaying the search results (or a select number of search result elements) in a stack at the search result label. This may provide a convenient way to reduce visual clutter at the display for search results that the user would like to keep available while the user performs other tasks or searches. In one non-limiting example, stacks of ten (or other number of) search result elements may be displayed at the search result label. Further, in embodiments including a next result control in the search result label, a user touch input to the next result control may cause a search result element at the top of the stack to be replaced or supplemented by a subsequent search result element. In another example, a user touch input to the next result control may cause the stack of search result elements to be replaced by a subsequent stack of search result elements.

As explained above, in some embodiments, the search result label may include a label control configured to perform a view switch action. Thus, in some of such embodiments, the user may toggle between a cluster view and a stack view by performing a touch input at the view switch control. Thus, in some embodiments, receipt of a user input at a view switch control may cause the search results to be changed from a cluster view to a stack view, changed from a stack view to a cluster view, or changed to some other suitable view arrangement.

Turning to FIG. 2B, method 200 comprises, at 216, severing the spatial tether between a particular search result element and the search result label responsive to receiving a touch input moving the search result element away from the search result label. Unlike a touch input moving the search result label, which causes the search result to follow the search result label, moving a search result element does not cause the search result label or the other search result elements to follow the particular search result element. Accordingly, a user may select one or more search result elements from the search result for additional interaction without causing the other search elements to move on the display. For example, the user may drag search result elements originating from multiple search requests into a common region of the screen in the course of performing and refining a search objective while the other search results remain spatially tethered to their respective search result labels.

In some embodiments, process 216 may comprise, at 218, severing the spatial tether if the particular search result element is moved beyond a predetermined spatial tether frontier of the related search result label. This may provide a basis for judging user intent to sever the spatial tether so that an intended move may be distinguished from an inadvertent touch. Thus, in some embodiments, if the search result element does not move beyond the spatial tether frontier, the search result element may snap or slide back to search result label. It will be understood that intent to sever the spatial tether may be determined by any suitable process without departing from the scope of the present disclosure.

Because the user may have results from more than one search request displayed concurrently, it may be difficult for the user to keep track of the origin of the search request elements once some of the search result elements are separated from their respective search result labels. Thus, in some embodiments, method 200 may comprise, at 220, maintaining a logical tether between the search result label and the search result element if a search result element is moved away from the search result label. Put another way, the interactive display device may keep track of the relationship between the search result label and the search result element once the user has moved that particular search result element spatially away from the search result label.

In some embodiments, a search result element may display a search element marker once it is moved away from the search result label. For example, the search element marker may include a visual cue keyed to a search result marker (mentioned above with respect to process 206) displayed at the corresponding search result label. Accordingly, in such embodiments, method 200 includes, at 222, displaying a search element marker keyed to the search result label displayed at the search result element.

Additionally or alternatively, in some embodiments, the search result element may include one or more element controls logically tethered to the search result label. Thus, a user interacting with a search result element may access information about the search request that originated that search result element and/or information about that search result element itself Further, the user interaction with the element control may trigger a result manifested at the search result element, the search result label, or both. Accordingly, method 200 may comprise, at 224, including an element control configured to perform one or more of an element close action and an element view action responsive to a touch input to the appropriate element control.

In one scenario, a user touch to an element close control at the search result element may cause the search result element, the search results, and/or the search result label to close, so that the search results are retired from the display. Because a plurality of users may be interacting with one or more search result elements, in some embodiments, a user touch to the element close control may start a countdown timer prior to performing the close action. This may provide a suitable delay allowing a user to stop the close action. A visual cue, such as a ghost effect and/or an animation effect may be displayed at one or more of the search result elements and the search result label to alert the user or users to a pending close action.

In another scenario, a user touch to an element view control may spawn a display of metadata for the search result element and/or the search request that spawned that search result element. The metadata display may be spawned at any suitable location on the display. For example, the metadata may be displayed adjacent to the search result element, in place of the search result element, or on a display of a reverse side of the search result element. For example, in some embodiments, a user touch to an element view control may initiate an animated flipping (or turning over) of the search result element to display a back side of the search result element, the back side displaying metadata for the search result element. As described above, suitable gestures may be used to achieve the same result. Such gestures may be perceived by a user as being cognitively similar to flipping a photo over to read notes about the photo, such as a date or a location where the photo was taken.

In some embodiments, two or more searches may be concatenated by moving one search label over another, moving one search result element over another, moving two or more search labels over the search request control, etc. This is illustrated at 226, where method 200 comprises receiving a new search request responsive to a search result element from another search result being positioned at the search request control. Thus, a user may select one or more search result elements from one or more search results and drag those search result elements to the search request control to spawn the new search request. In some embodiments, the new search request may be modified by the selection and addition of additional search result elements, so that a user's search experience may evolve, collaboratively or temporally, as the user or users interact with different search results. Once the new search request is received, method 200 continues to 228, comprising spawning or otherwise generating a new search result label, and to 230, comprising displaying the new search results comprises so that they are spatially tethered to the new search result label.

As introduced above, FIGS. 3-15 schematically depict embodiments of user interfaces that illustrate various aspects of the embodiment of FIGS. 2A and 2B. The example displays shown in FIGS. 3-15 present the results of a series of image search requests. However, it will be appreciated that the embodiments described herein may be used with any suitable search request. Non-limiting examples of other search request include web search requests, and video search requests.

Figure 3:
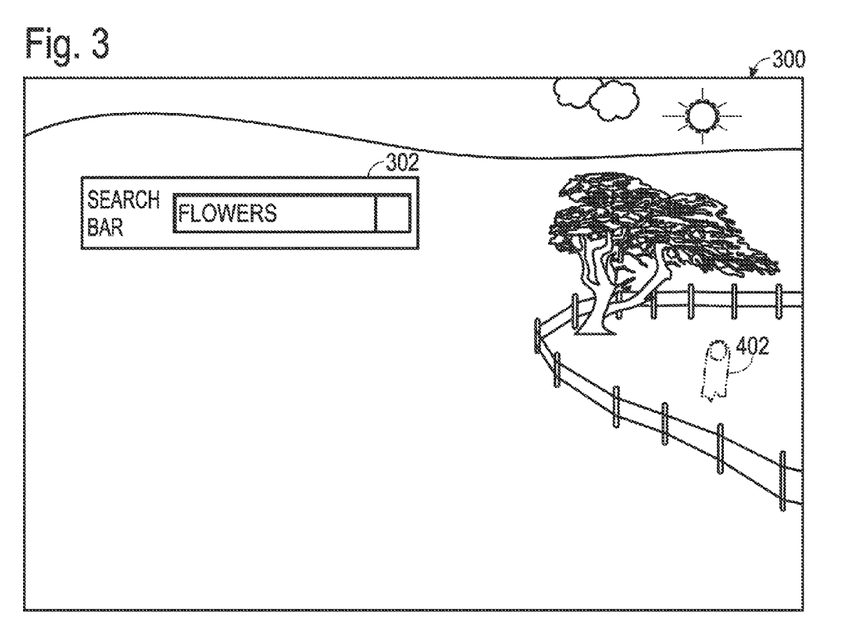
FIG. 3 schematically shows an embodiment of a user interface of an interactive display device including a search request control.

FIG. 3 schematically shows a display 300 on which a search request control 302 is displayed, into which a search request for "FLOWERS" has been input. As shown in FIG. 3, search request control 302 is presented as a search bar in operative communication with a search engine, though other suitable search request controls may be provided to the user at the interactive display device and/or via a suitable computing device networked with the interactive display device. FIG. 3 also shows, in schematic form, a finger 402, with which touch input may be provided to the display. However, as explained above, touch input and gesture-based input to the display may be provided via any suitable touch input instrument (e.g., a stylus, a machine-viewable tag, etc.). Thus, it will be appreciated that finger 402 represents any suitable instrument used to provide a suitable user touch or hover input.

Figure 4:
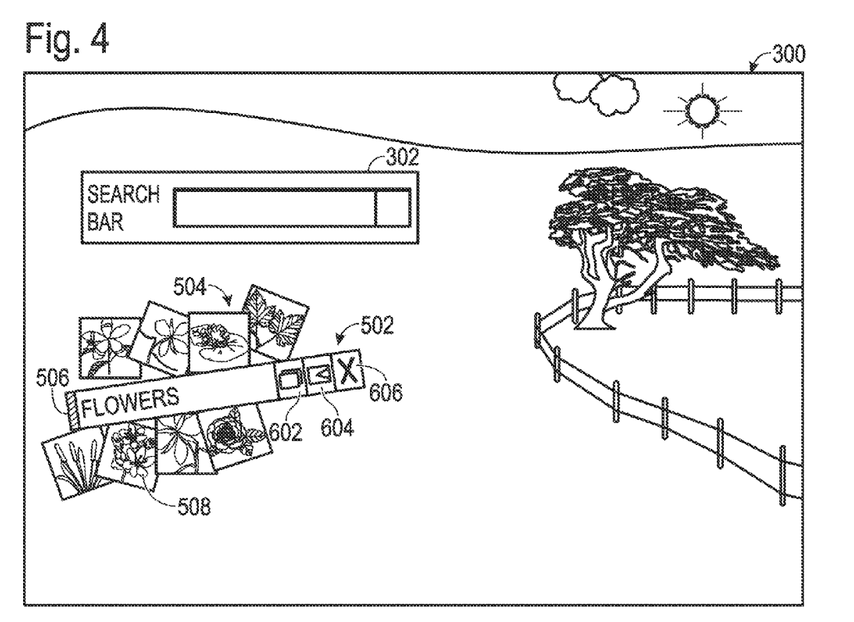
FIG. 4 shows the embodiment of FIG. 3 displaying search results clustered around a search result label after receiving a search request and performing a search.

FIG. 4 schematically shows search result label 502 for the search request "FLOWERS" on display 300. A set of eight search results 504, including a plurality of search result elements 508, are shown clustered around search result label 502, though it will be appreciated that any suitable number of search result elements 508 may be displayed. Search result label 502 includes a search result marker 506. As shown in FIG. 4, search result marker 506 is a hatched band. However, it will be appreciated that any distinct visual cue may be employed with search result marker 506.

Figure 5:
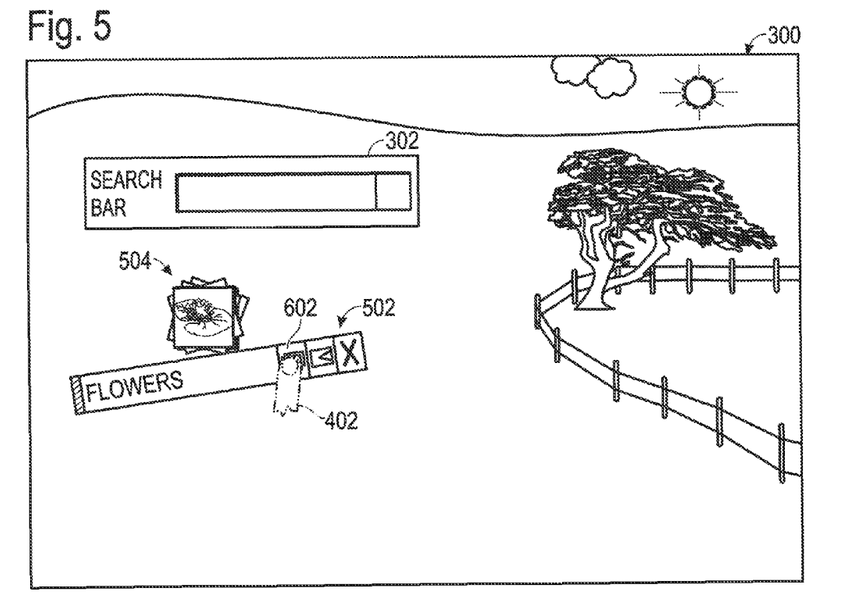
FIG. 5 shows the embodiment of FIG. 4 displaying the search results in a stack view after being moved and receiving a view switch input.

As shown in FIG. 4, search result label 502 includes a trio of control elements. Specifically, search result label 502 includes a view switch control 602, a next result control 604, and a label close control 606. A touch input to view switch control 602 may be used to swap view arrangements for search results 504, such as between a cluster view (as shown in FIG. 4) and a stack view (as shown in FIG. 5). A touch input to next result control 604 may be used to toggle through additional search result elements 508. A touch input to label close control 606 may be used to close search results 504 and search result label 502 if the user is finished interacting with that particular search result. It will be understood that these specific examples of controls are depicted for the purpose of example and are not intended to be limiting in any manner, as a search result label may include any suitable controls that relate to actions to be performed with the search results.

FIG. 5 schematically shows finger 402 hovering over view switch control 602 of search result label 502. Responsive to the input at view switch control 602, display 300 presents search results 504 for the search request "FLOWERS" in a stack view. While a transition between a cluster and a stack view is described herein by way of explanation, any suitable transition between any suitable views may be employed without departing from the scope of the present disclosure.

Figure 6:
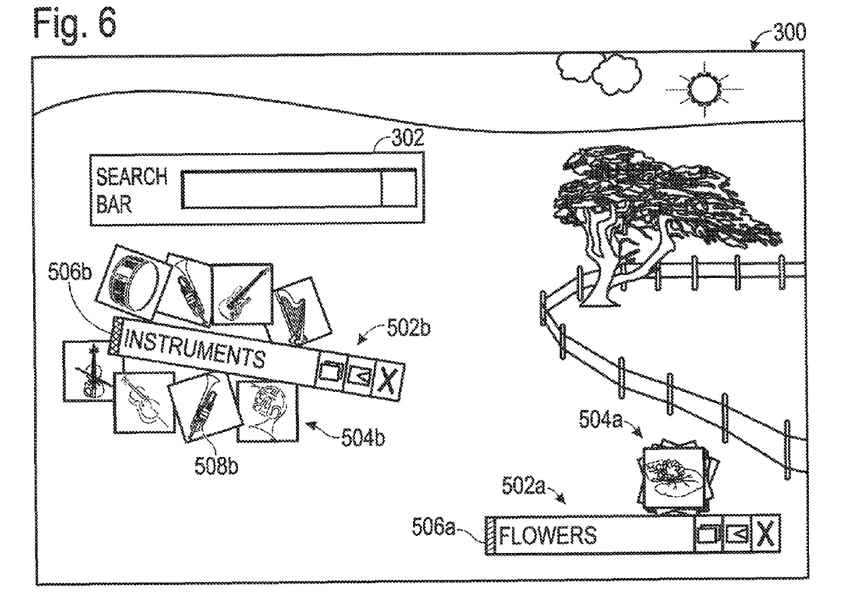
FIG. 6 shows the embodiment of FIG. 5 displaying search results clustered around a second search result label after receiving another search request.

As explained above, more than one search result may be spawned and manipulated concurrently. FIG. 6 schematically shows search result label 502a, search results 504a, and search result marker 506a, each corresponding to the search request for "FLOWERS" shown in FIG. 5. As shown in FIG. 6, search result label 502a has been moved from a left portion of display 300 (see FIG. 5) to a right portion of display 300. Search results 504a, being spatially tethered to search result label 502a, have followed the movement of search result label 502a to the right portion of the display.

FIG. 6 also depicts search results 504b of a search request for "INSTRUMENTS" as eight search result elements 508b clustered around search result label 502b. Search result label 502b also includes a search result marker 506b that has a distinct appearance (cross-hatched) from the appearance of search result marker 506a (hatched). It will be understood that the search result markers and search element markers (discussed below with respect to FIG. 8) are depicted with hatch markings for clarity, and that any suitable marking providing a visual cue to distinguish the relationships among the search result labels and/or search result elements may be employed without departing from the scope of the present disclosure. Non-limiting examples include suitable displays of colors, patterns, and/or symbols, as well as suitable animation effects.

Figure 7:
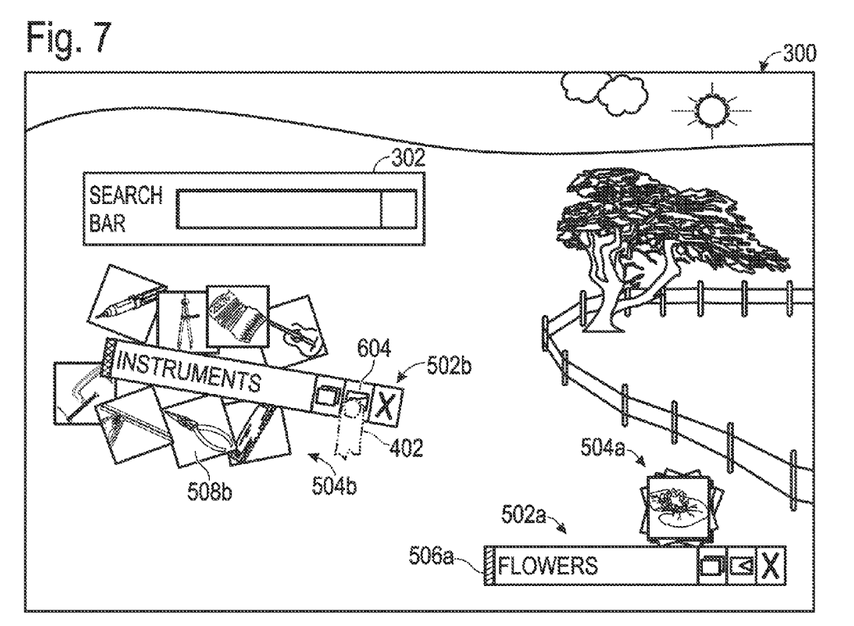
FIG. 7 shows the embodiment of FIG. 6 displaying another set of search result elements clustered around the second search result label after receiving a next result input.

FIG. 7 schematically shows finger 402 hovering over next result control 604. Responsive to the input at next result control 604, display 300 presents a next set of search results 504b for the search request "INSTRUMENTS" in a cluster view. While all eight of the search result elements shown in search results 504b have been replaced by search results 504b, it will be appreciated that the next result control may trigger any suitable transition between search results 504 and/or search result elements 508 without departing from the scope of the present disclosure. Non-limiting examples of transitions include sequentially replacing search result elements 508 and replacing subsets of search results 504 at each input to next result control 604.

Figure 8:
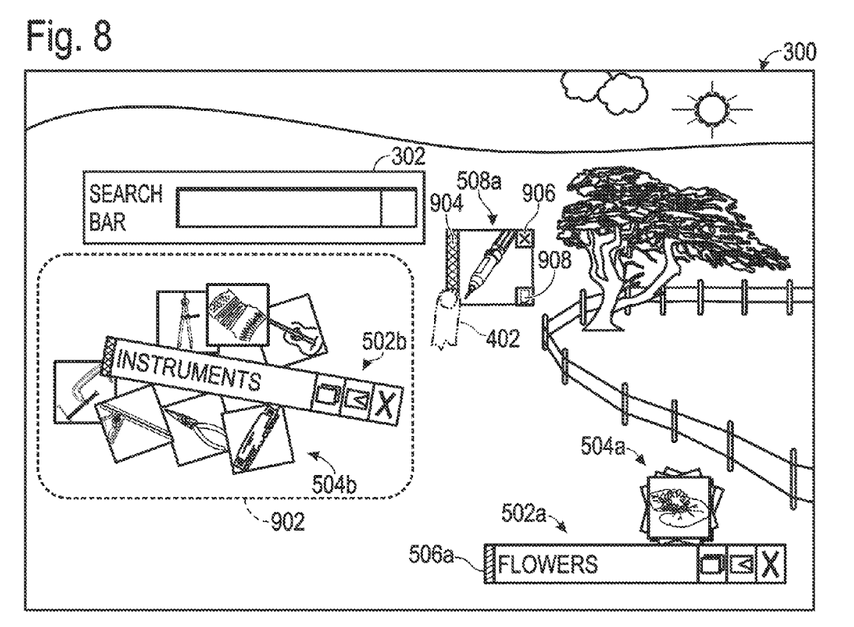
FIG. 8 shows the embodiment of FIG. 7 displaying a search result element being moved away from the second search result label.

FIG. 8 schematically shows search result element 508a from search results 504b for the search request "INSTRUMENTS" being moved by touch input from finger 402 to a region of display 300. In some embodiments, the spatial tether between search result label 502b and search result element 508a may be severed when the user touches search result element 508a to drag it away from search result label 502b. Alternatively, in some embodiments, the spatial tether may be severed once search result element 508a is moved beyond a predetermined spatial tether frontier 902 of search result label 502b. This may provide a basis for judging user intent to sever the spatial tether so that an intended move may be distinguished from an inadvertent touch. Thus, in the example shown in FIG. 8, if the search result element 508a does not move beyond spatial tether frontier 902, it may snap or slide back to search result label 502b.

A search element marker 904 is included in the example search result element 508A of FIG. 8. As shown in FIG. 8, search element marker 904 includes a visual cue (a cross-hatched stripe) keyed to the search result marker displayed at corresponding search result label 502b. Search result element 508a also includes an element view control 908 and an element close control 906. A touch input to element view control 908 may spawn another display related to search result element 508a, as described in more detail below with respect to FIG. 11.

A touch input to element close control 906 may cause search result element 508a, search results 504b, and/or search result label 502b to close. As explained above, in some embodiments, a touch input to element close control 906 may start a countdown timer prior to performing the close action. This may provide a suitable delay allowing a user to stop the close action. A visual cue, such as a ghost effect and/or an animation effect may be displayed at one or more of the search result elements and the search result label to alert the user or users to a pending close action.

Figure 9:
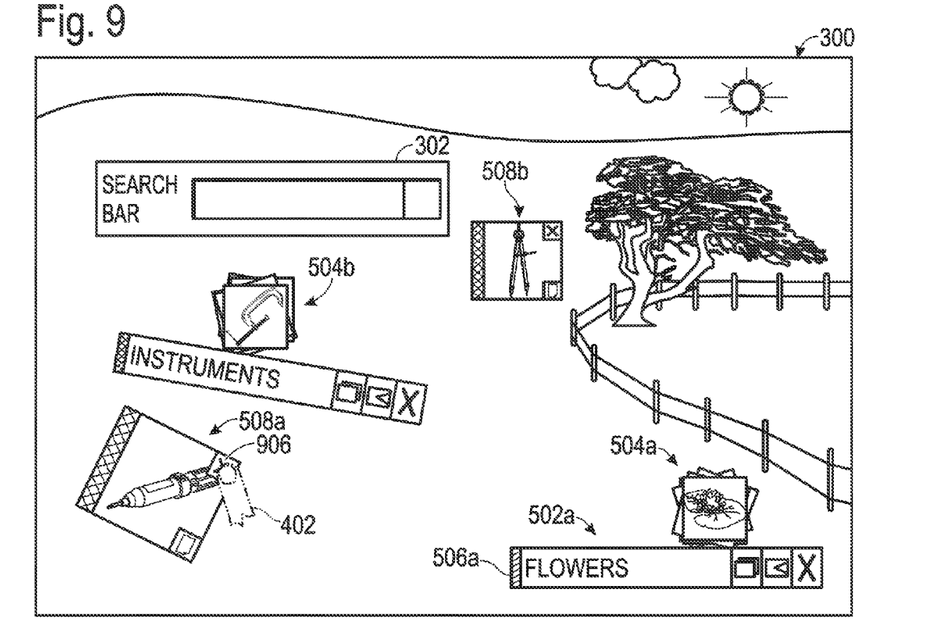
FIG. 9 shows the embodiment of FIG. 8 displaying a second search result element being moved away from the second search result label.

FIG. 9 schematically shows that search result element 508a has been moved from a right portion of display 300 to a left portion of display 300 as finger 402 is poised to provide a touch input to element close control 906. FIG. 9 also depicts a second search result element 508b from search results 504b, search result element 508b being located in a right region of display 300.

Figure 10:
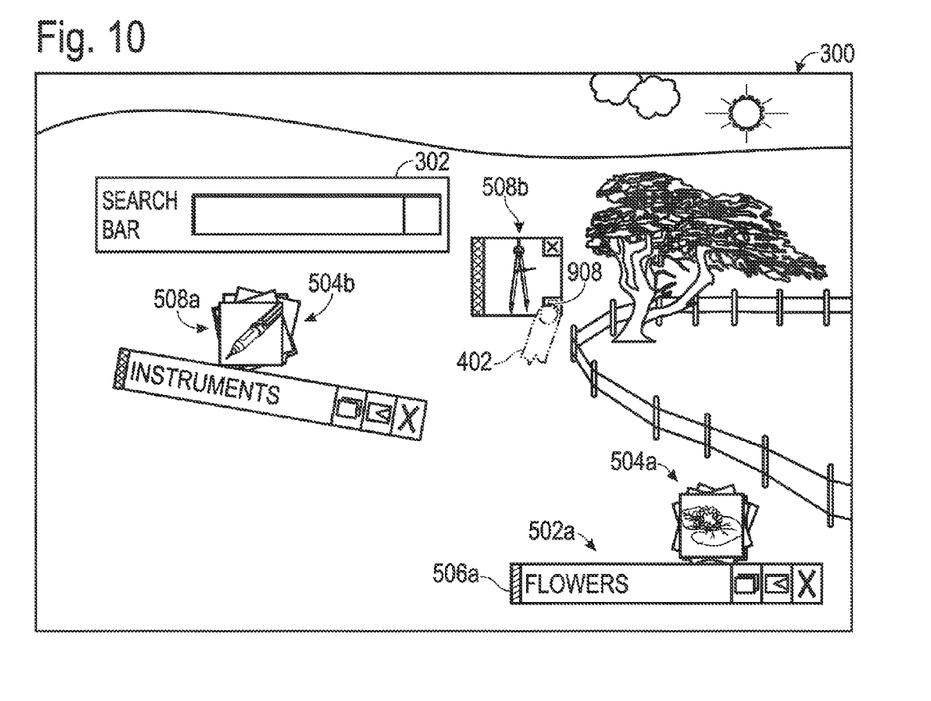
FIG. 10 shows the embodiment of FIG. 9 after receiving an element close input.

FIG. 10 schematically shows display 300 at a time after element close control 906 of search result element 508a has been triggered by finger 402. Search result element 508a appears at the top of the stack view of search results 504b, while search result element 508b remains in position in the right portion of display 300.

Figure 11:
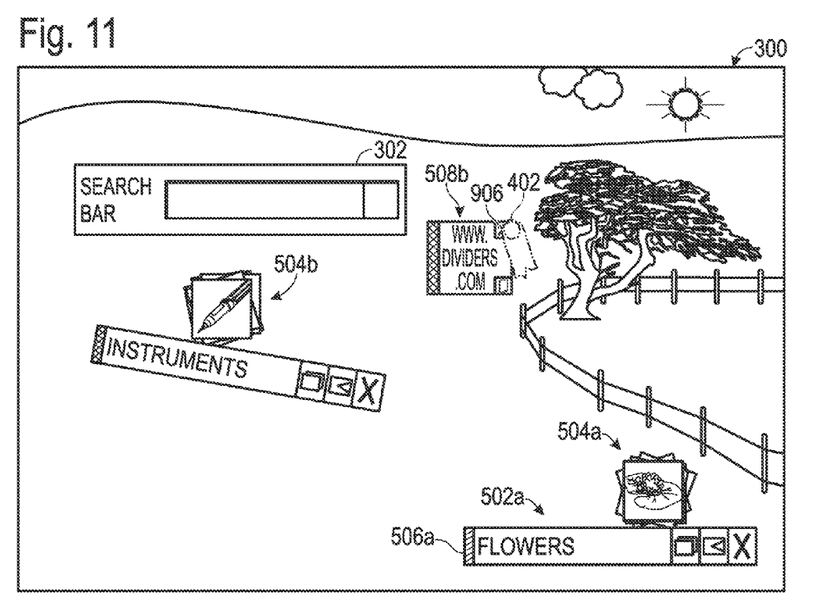
FIG. 11 shows a display of a reverse side of a search result element of the embodiment of FIG. 10 after receiving an element view control input.

FIG. 10 also shows finger 402 poised to provide a touch input to element view control 908 of search result element 508b. As introduced above, a touch input to element view control 908 may spawn or change another display related to search result element 508. In some embodiments, a touch input to element view control 908 may spawn a display of metadata for a particular search result element 508 and/or the search request associated with that particular search result element 508. The metadata display may be spawned at any suitable location on the display. For example, the metadata may be displayed adjacent to the search result element, in place of the search result element, or on a display of a reverse side of the search element result. For example, FIG. 11 schematically shows a display of a reverse side of search result element 508b. In the example shown in FIG. 11, metadata describing a source for the image shown in search result element 508b is displayed.

Figure 12:
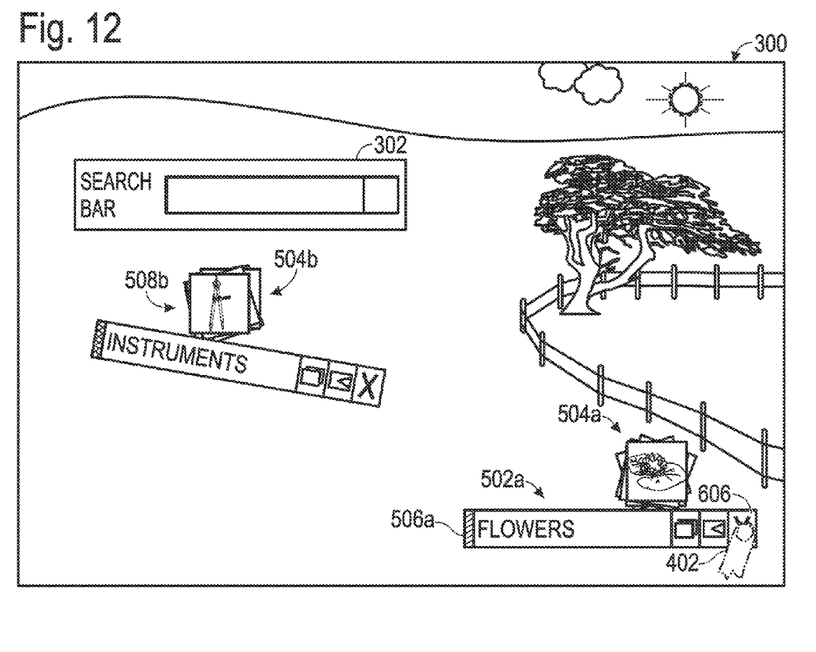
FIG. 12 shows the embodiment of FIG. 11 after receiving an element close input.
Figure 13:
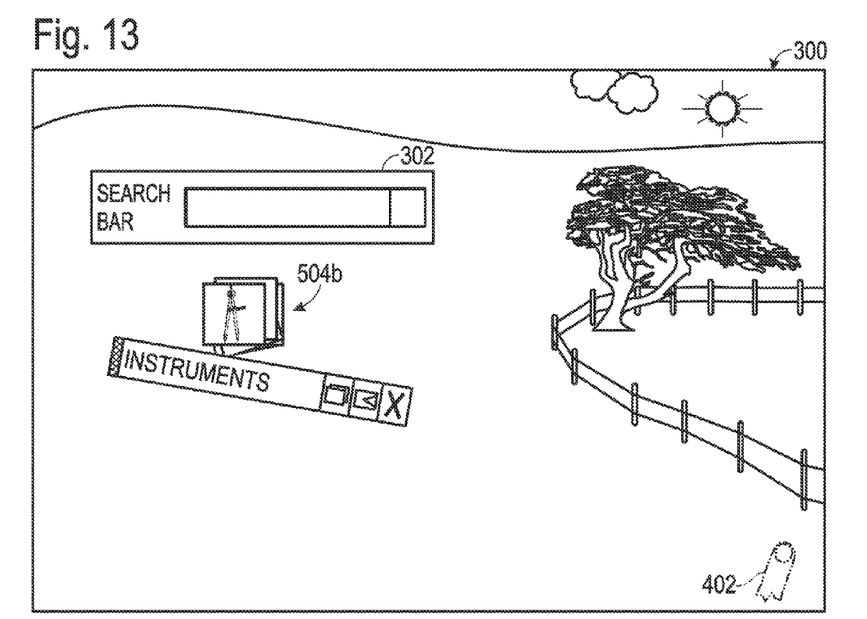
FIG. 13 shows the embodiment of FIG. 12 after receiving a label close input.

FIG. 11 also shows finger 402 poised to provide a touch input to element close control 906 for search result element 508b, while FIG. 12 schematically shows display 300 at a time after element close control 906 of search result element 508b has been triggered by finger 402. Search result element 508b appears at the top of the stack view of search results 504b. FIG. 12 also shows finger 402 poised to provide a touch input to label close control 606 of search result label 502a. FIG. 13 schematically shows display 300 at a time after label close control 606 of search result label 502a has been triggered by finger 402.

As explained above, in some embodiments, a user may perform a concatenated search by moving a label or result from one search over a label or result from another search, by moving two or more labels or results over the search request control, or in other such manner to spawn a new search request. The new search request may be augmented and/or refined by the selection and addition of additional search result elements (for example, via the search request control), so that a user's search experience may evolve, collaboratively and temporally, as the user or users interact with different search results.

Figure 14:
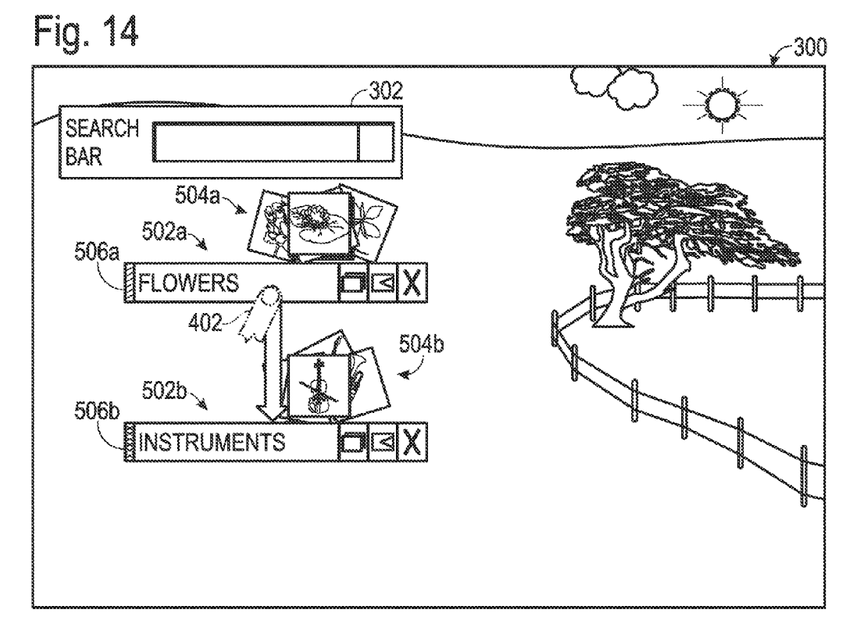
FIG. 14 schematically shows an embodiment of an interactive display device, including a display of moving of a search label over another search label to request a third search.
Figure 15:
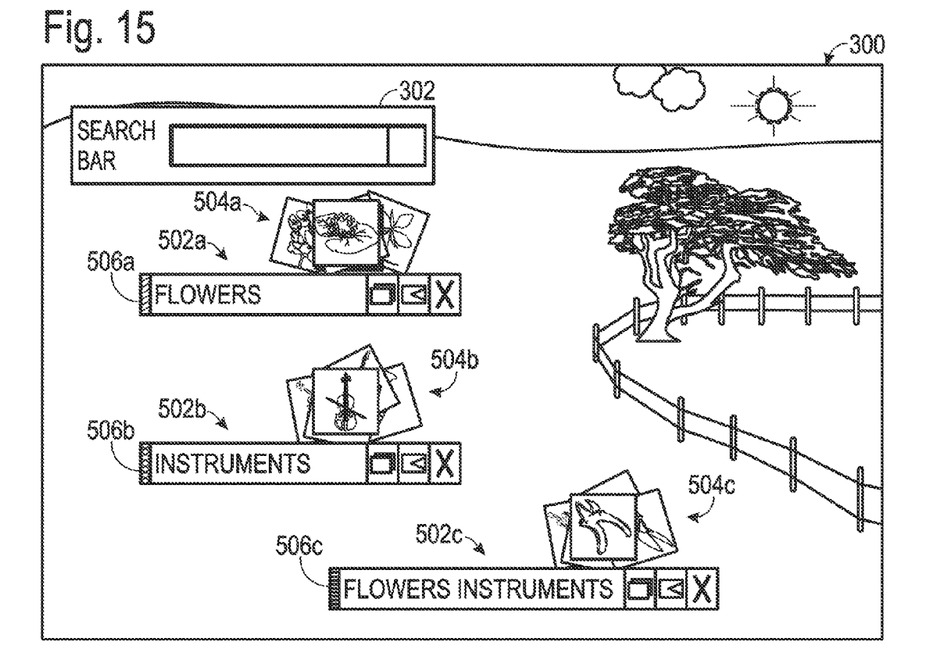
FIG. 15 shows the embodiment of FIG. 14 displaying a third set of search results at a third search result label after receiving a third search request.

For example, FIG. 14 schematically shows display 300 including search results 504a for a search request for "FLOWERS" and search results 504b for a search request for "INSTRUMENTS." As shown in FIG. 14, search label 506a is moved over label 506a, forming the basis for a new search request input that concatenates "FLOWERS" and "INSTRUMENTS." The result is schematically shown in FIG. 15, which depicts search result label 502c "FLOWERS INSTRUMENTS" with search results 504c being arranged in a stack view nearby.

Figure 16:
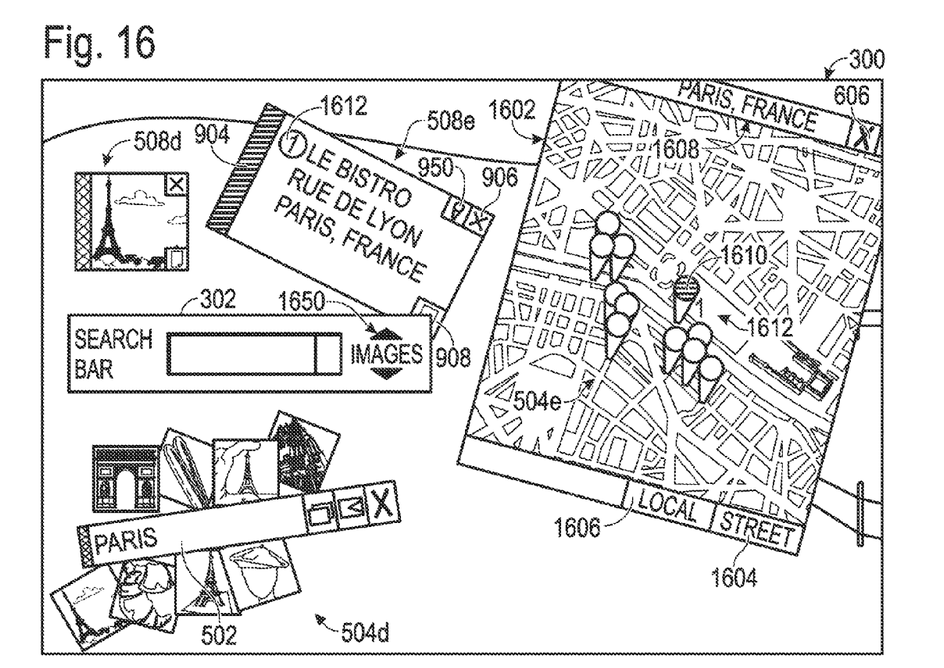
FIG. 16 schematically shows an embodiment of an interactive display device, including a display of a map-type search result and an image-type search result.

As explained above, any suitable objective may be searched and manipulated without departing from the scope of the present disclosure. For example, FIG. 16 schematically shows display 300 including search request control 302. In the embodiment shown in FIG. 16, search request control 302 includes a search type control 1650 that allows the user to selectively control a type of search result the user would like to receive from the search. As shown in FIG. 16, search type control 1650 is set to perform an image search and return image results. For example, the embodiment shown in FIG. 16 displays a search result label 502, around which search results 504d for a search for "PARIS" are clustered. It will be understood that other suitable types, including, but not limited to, map searches, web searches, and video searches, may be selected with search type control 1605. For example, FIG.

16 also shows a map result 1602 bearing a map result label 1608 indicating that map result 1602 is related to a map search for "PARIS, FRANCE."

Search results 504 resulting from a map search (for example, like search results 504e shown in FIG. 16), may be related to the particular search that resulted in the generation of map result 1602 and/or may be related to one or more search results 504 (such as search result 504d in the example shown in FIG. 16) with which a user is interacting concurrently. Thus, in one scenario, a user interaction with search results 504d, such as selection of a next set of search results, may alter the search results 504e presented on map result 1602.

As shown in FIG. 16, map result 1602 includes a street map view decorated with one or more search results 504e. In some embodiments, map result 1602 may include a map type control 1604, so that a user may select a street map, a satellite map, a bird's eye view map, or any other suitable map type for display. For example, in the embodiment shown in FIG. 16, map type control 1604 is set to display a street map view of a portion of Paris, France. Additionally or alternatively, in some embodiments, map results 1602 may include a map zoom control 1606 so that a user may select a magnification level for the displayed map. For example, the embodiment shown in FIG. 16 shows a "local" level setting, though it will be appreciated that any suitable zoom control scheme, including schemes characterized by, for example, distances or political divisions, may be used without departing from the scope of the present disclosure. Other suitable controls may be included in map result 1602 in some embodiments. For example, the embodiment shown in FIG. 16 shows a label close control 606 included in map result label 1608 configured to close map result 1602 when selected by a user.

In the embodiment shown in FIG. 16, search results 504e include map locations designated by pushpin-style location indicators 1610, though it will be appreciated that any suitable location indicator may be used to geographically convey search result information. For example, a particular search result element 508e for a café "Le Bistro" is shown pulled out from map result 1602 in FIG. 16. In the embodiment shown in FIG. 16, search result element 508e includes an element view control 908 (which may provide a display of information about search result element 508e and/or additional map functionality, such as pathfinding/direction finding functionality), an element close control 906 for closing the display of search result element 508e, and a search element marker 904. In the embodiment shown in FIG. 16, search element marker 904 includes a visual cue (a hatched stripe) and a numeric indicator 1612 (a circled 1) keyed to a hatched location indicator 1610 included in map result 1602. As a further, optional visual cue, map result 1602 displays numeric indicator 1612, marked "1," corresponding to search result element 508e. In some embodiments, a search result element generated from a map result may include a map control 950. For example, in the embodiment shown in FIG. 16, map control 950 may be configured to allow a user to adjust an appearance of a location indicator 1610 for a particular search result element 508e on map result 1602.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of displaying search results on an interactive display device, the method comprising:
    receiving a first search request input via a search request control displayed on the interactive display device;
    spawning a first search result label spaced from the search request control, the first search result label being a first moveable element;
    displaying a first search result while maintaining display of the search request control, the first search result comprising one or more search result elements, the first search result being spatially tethered to the first search result label so that the search result elements move to follow movements of the first search result label;
    receiving a second search request input via the search request control displayed on the interactive display device;
    spawning a second search result label spaced from the search request control, the second search result label being a second moveable element; and
    displaying a second search result while maintaining display of the search request control and the first search result, the second search result comprising one or more additional search result elements, the second search result being spatially tethered to the second search result label so that the one or more additional search result elements move to follow movements of the second search result label.

2. The method of claim 1, wherein the first search result comprises a plurality of search result elements clustered around the first search result label.

3. The method of claim 2, further comprising receiving a user input selecting to switch views of the first search result, and in response changing the search result elements from a cluster view to a stack view.

4. The method of claim 1, wherein the first search result comprises a plurality of search result elements arranged in a stack at the first search result label.

5. The method of claim 4, further comprising receiving a user input selecting to switch views of the first search result, and in response changing the search result elements from a stack view to a cluster view.

6. The method of claim 1, further comprising severing a spatial tether that spatially tethers a particular search result element to the first search result label responsive to a touch input moving the particular search request element away from the first search result label.

7. The method of claim 6, further comprising retaining a logical tether between the particular search result element and the first search result label after severing the spatial tether.

8. The method of claim 6, wherein the spatial tether is severed once the particular search result element is moved beyond a spatial tether frontier of the first search result label, and wherein the spatial tether is maintained if the particular search result element is not moved beyond the spatial tether frontier.

9. The method of claim 6, wherein the particular search result element includes a search element marker keyed to the first search result label and wherein the particular search result element includes an element control configured to perform one of an element close action and an element view action responsive to a touch input to the element control.

10. The method of claim 1, wherein the first search result label comprises a label control configured to perform one or more of a label close action, a view switch action, and a next result action responsive to a touch input to the label control.

11. The method of claim 1, further comprising performing a concatenated search responsive to one or more of a search result element and a search label being moved over one or more of the search request control, another search result element, and another search label.

12. The method of claim 11, further comprising displaying a new search label and new search results after performing the concatenated search.

13. An interactive display device, comprising:
- a display;
- a touch and/or hover detection subsystem configured to detect touches on and/or gestures over the display;
- a data-holding subsystem; and
- a logic subsystem configured to execute instructions stored in the data-holding subsystem, the instructions configured to:
  - receive a first search request input via a search request control displayed on the interactive display device,
  - spawn a first search result label spaced from the search request control, the first search result label being a first moveable element,
  - display a first search result while maintaining display of the search request control, the first search result comprising one or more search result elements, the first search result being spatially tethered to the first search result label so that the search result elements move to follow a movement of the first search result label,
  - receive a second search request input via the search request control displayed on the interactive display device,
  - spawn a second search result label spaced from the search request control, the second search result label being a second moveable element, and
  - display a second search result while maintaining display of the search request control and the first search result, the second search result comprising one or more additional search result elements, the second search result being spatially tethered to the second search result label so that the one or more additional search result elements move to follow movements of the second search result label.

14. The device of claim 13, wherein the first search result comprises a plurality of search result elements displayed as one of a cluster of search result elements surrounding the first search result label and a stack of search result elements at the first search result label.

15. The device of claim 13, the instructions further configured to sever a spatial tether that spatially tethers a particular search result element to the first search result label responsive to a touch input moving the particular search request element away from the first search result label.

16. The device of claim 15, the instructions further configured to retain a logical tether between the particular search result element and the first search result label after severing the spatial tether.

17. The device of claim 16, the instructions further configured to display, at the particular search result element, one of a search element marker keyed to the first search result label and an element control configured to perform one of an element close action and an element view action responsive to a touch input to the element control.

18. The device of claim 13, the instructions further configured to display a label control at the first search result label, the label control configured to perform one or more of a label close action, a view switch action, and a next result action responsive to a touch input to the label control.

19. A method of displaying search results on an interactive display device, the method comprising:
- receiving a first search request input via a search request control displayed on the interactive display device;
- spawning a first search result label spaced from the search request control, the first search result label being a first moveable element;
- displaying a first search result, the first search result being spatially tethered to the first search result label so that the first search result moves to follow a movement of the first search result label;
- receiving a second search request input via the search request control displayed on the interactive display device;
- spawning a second search result label spaced from the search request control, and spaced from the first search result label, the second search result label being a second moveable element; and
- displaying a second search result while maintaining display of the first search result, the second search result being spatially tethered to the second search result label so that the second search result moves to follow a movement of the second search result label.

20. The method of claim 19, further comprising receiving a third search request via movement of the first search result label over the second search result label, the third search request spawning a third search result label.

* * * * *